United States Patent

[11] 3,548,966

| [72] | Inventor | John Stirling Blacket<br>Tamanick, Mitchell, Queensland, Australia |
|---|---|---|
| [21] | Appl. No. | 819,927 |
| [22] | Filed | Apr. 28, 1969 |
| [45] | Patented | Dec. 22, 1970 |

[54] AUTOMATIC STEERING MEANS FOR AN AGRICULTURAL TRACTOR
10 Claims, 3 Drawing Figs.

[52] U.S. Cl...................................................... 180/79.2,
280/87.2; 172/26; 172/278; 180/96; 104/244.1
[51] Int. Cl.......................................................... B62d 1/24
[50] Field of Search............................................. 280/87.2;
180/79, 79.1, 79.2; 104/244.1; 172/26, 278;
180/96

[56] References Cited
UNITED STATES PATENTS

| 1,114,586 | 10/1914 | Cuddy............................. | 280/87.2 |
| 1,588,497 | 6/1926 | Rietzke ......................... | 280/87.2 |
| 1,977,273 | 10/1934 | Hansen.......................... | 104/244.1 |
| 1,980,553 | 11/1934 | Salisbury....................... | 180/79UX |
| 2,880,937 | 4/1959 | King.............................. | 172/26X |
| 3,116,806 | 1/1964 | Rose.............................. | 172/278X |
| 3,402,784 | 9/1968 | Roberson et al............... | 280/87.2X |

*Primary Examiner*—Kenneth H. Betts
*Attorney*—Stevens, Davis, Miller and Mosher ABSTRACT: The automatic steering of a tractor is accomplished by independently-mounted guide wheels which follow a furrow adjacent the tractor and which steer the tractor front wheels. Correction means are provided to move the two guide wheels laterally when one guide wheel is raised above the other.

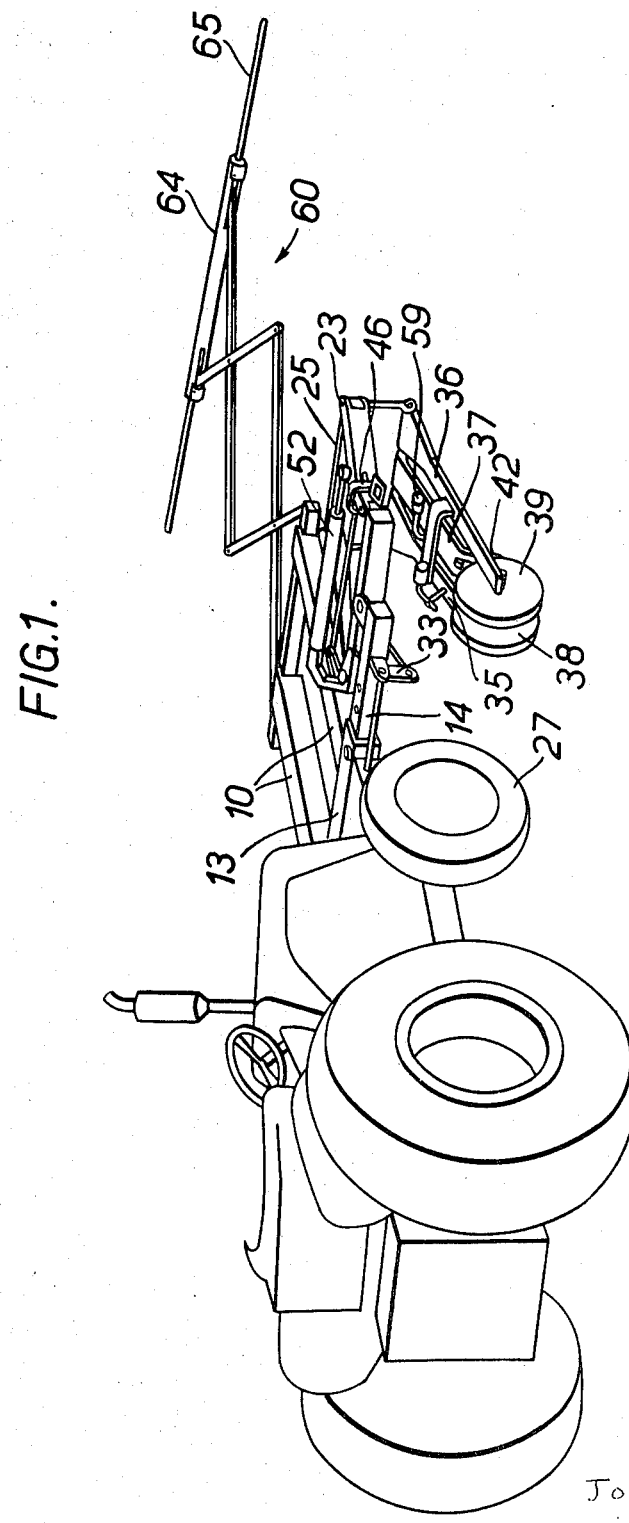

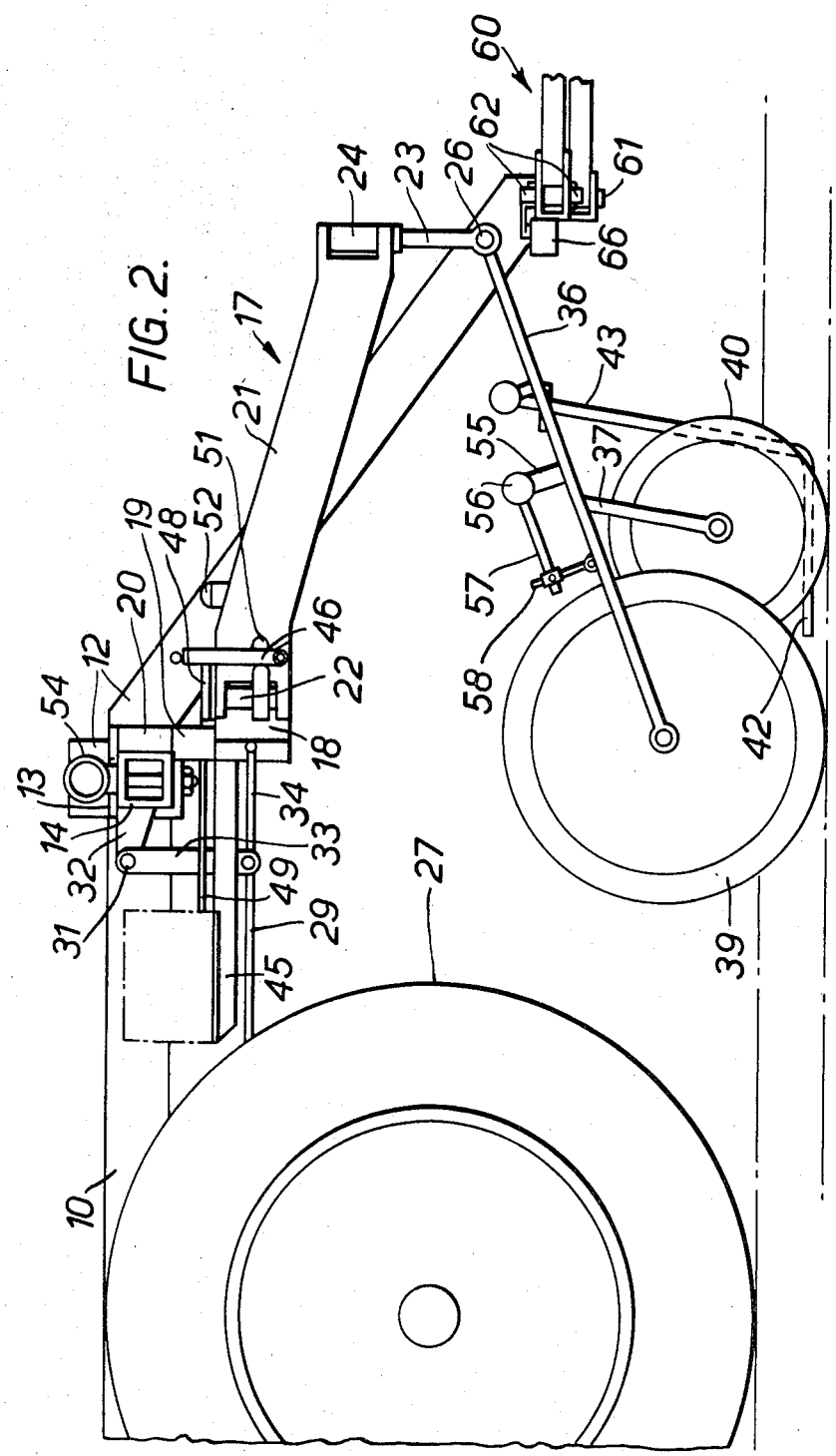

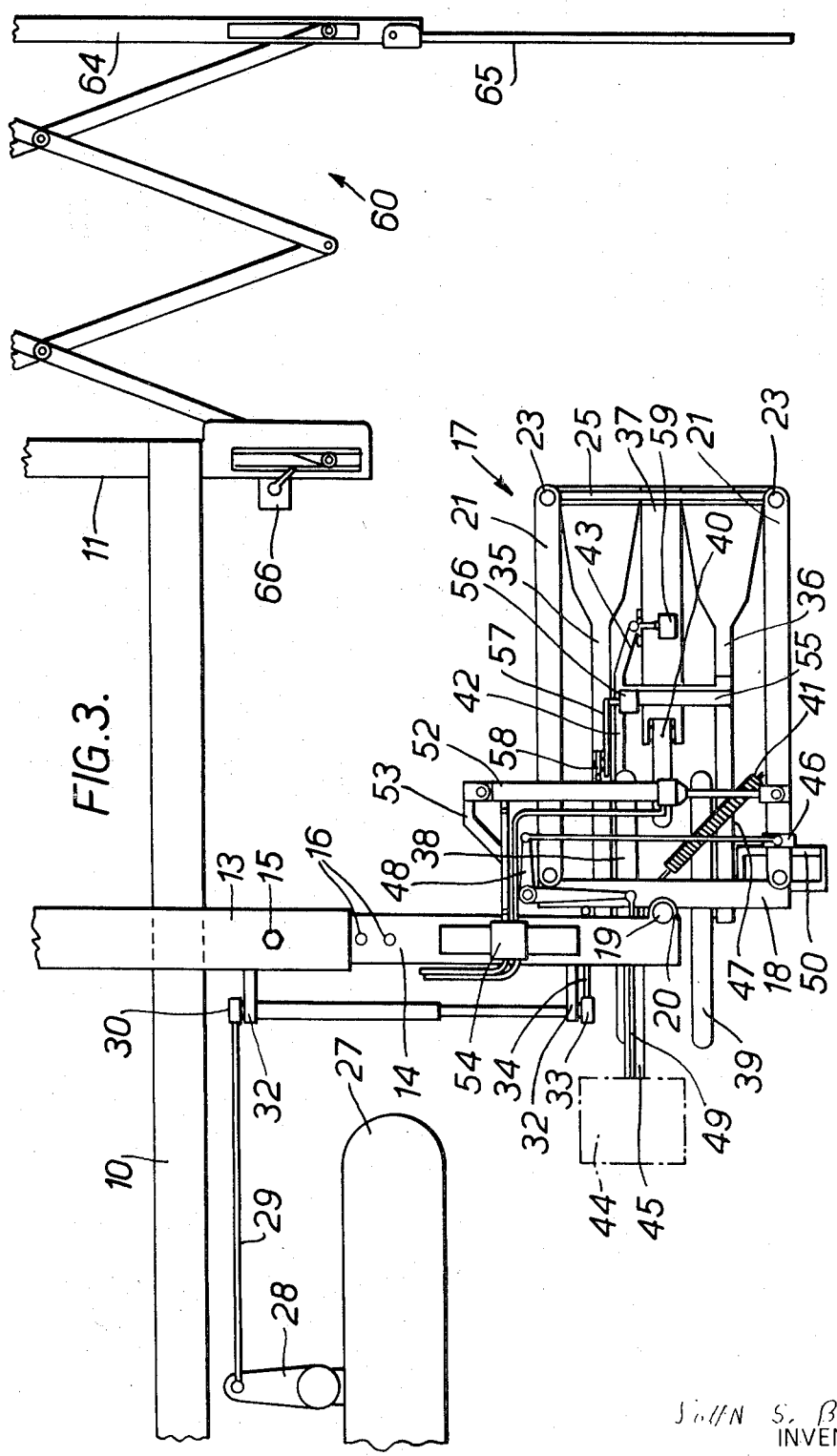

AUTOMATIC STEERING MEANS FOR AN AGRICULTURAL TRACTOR

This invention relates to improvements in automatic steering means for an agricultural tractor.

The general object of the invention is to provide for a tractor a guiding device adapted to guide the tractor for spiral ploughing operations so that, an operator having steered the tractor, with its plough, on the first circuit of a paddock, thereafter the operator may leave the tractor which will continue, guided by the guiding device, to plough the whole of the paddock on a spiral course.

Accordingly, the invention resides broadly in automatic steering means for a tractor including a mounting frame adapted to be mounted on a tractor; means for mounting a pair of guide wheels on the mounting frame so that they are adapted to travel in a furrow adjacent to a side of the tractor, the said guide wheels being normally in spaced substantially coaxial alignment and adapted to move laterally in either direction to follow the furrow as the tractor advances, each guide wheel being further adapted to rise or fall independently of the other; means for transmitting lateral movement of the guide wheels to steering control means of the tractor to cause the tractor to be steered along a path parallel to that followed by the guide wheels, and correcting means whereby, if one guide wheel is caused to rise above the other in climbing a wall of the furrow, the two guide wheels are moved laterally in the direction of the lower guide wheel.

A preferred embodiment of the invention is shown in the accompanying drawings, wherein:

FIG. 1 is a perspective view of a tractor having an automatic steering device according to the invention mounted thereon, FIG. 2 is a side elevational view of the automatic steering device shown in FIG. 1., and FIG. 3 is a plan view of the device.

The automatic steering device includes a mounting frame having a pair of spaced longitudinal members 10 adapted to be secured to the chassis of a tractor and to extend forwardly of the tractor, being inclined downwardly in front where they are connected by a crossmember 11. Brackets 12 extending up from the members 10 some distance from their front ends have secured under them a transverse box section member 13, in which there is fitted closely but slidably a box section member 14, which extends to the right of the front of the tractor, and is held in desired laterally adjusted position by a bolt 15 passing through the member 13 and any selected one of a series of holes 16 through the telescopically mounted box section member 14.

A pivoted frame 17 is mounted on and extends forwardly from the right-hand side of the transverse box section member 14, this frame including a rear member 18 from the middle part of which there extends upwardly a spindle 19 rotatable in a bearing 20 on the right-hand part of the transverse member 14. The bifurcated rear ends of a pair of parallel-motion arms 21 are pivoted about parallel upright axes by pins passing through these rear ends and a pair of bearings 22 at the sides of the rear member 18. The front ends of the parallel-motion arms 21 are also bifurcated and apertured to receive rotatably the upper ends of a pair of hangers 23, on which are secured collars 24 fitting in the front bifurcations of the parallel-motion arms, and rigidly interconnected by a crosspiece 25. A cross-shaft 26 is secured between the lower ends of the hangers 23. As will be apparent from FIG. 2 the arms 21 extend downwardly so as to allow ample clearance between the top of the guide wheels and the bottom of the boxed frame 14 in case the tractor drops into a depression.

Means are provided whereby, as the front wheels of the tractor, (the right-hand one of which is shown at 27) are steered in one direction or the other, the pivoted frame 17 is correspondingly swung to one side or the other. To this end, an arm 28 extending from the steering knuckle of the right-hand tractor wheel 27 is connected by a link 29 to a lever 30 extending down from one end of a shaft 31 rotatable in bearing brackets 32, one on the box section member 13, the other on the telescopically adjustable member 14, the shaft 31 being of two parts telescopically engaged, the inner one being non-rotatable relative to the other part. A lever 33 extending down from the other end of the telescopic shaft 31 is connected by a link 34 to one side portion of the rear member 18 of the pivotal frame 17.

Hingedly mounted on and trailing from the cross-shaft 26 are two guide wheel mounting brackets 35 and 36 and between them a carrier wheel mounting bracket 37. The guide wheel mounting brackets have stub axles directed towards each other from their rear parts to carry a pair of similar guide wheels 38 and 39. The rear part of the carrier wheel mounting bracket 37 is forked and carries the axle of a carrier wheel 40, of somewhat less diameter than, and located ahead of, the guide wheels.

When, in spiral ploughing operations, the first furrow has been completed with the tractor guided by its driver, the tractor may continue, automatically guided, with the guide wheels 38 and 39 and the carrier wheel 40 running in the completed furrow, the tractor travelling on unploughed ground to the left of, and normally being steered along a path substantially parallel to, the said furrow. A tension spring 41 connected between the right-hand parallel motion arm 21 and the rear member 18 of the pivoted frame 17 urges the left-hand guide wheel 38 to the left-hand wall of the furrow. A shoe 42 normally bears against this wall of the furrow, and is a substantially horizontal member, a short distance above the bottom of the carrier wheel 40, and on the lower end of a rod 43 the upper part of which is pivoted about a longitudinal axis to the carrier wheel mounting bracket 37, and spring-loaded so that the shoe 42 is urged towards the left.

A steering control for the tractor, which may be of well-known orbitrol fluid steering type, and which is indicated diagrammatically at 44, is mounted on a bracket 45 extending to the rear of the pivoting frame rear member 18. This steering control is adapted to steer the tractor in one direction or the other, when the guide wheels 38 and 39, following the furrow, move in parallelism to one side or the other, causing the parallel-motion arms 21 to move or oscillate to one side or the other. An inverted-U shaped member or stirrup 46, straddling the right-hand parallel-motion arm to which its lower ends are pivoted, has its upper end connected by a link 47 to one arm of a bellcrank 48 fulcrumed on the left-hand side of the rear member 18 of the pivoted frame 17, the other arm of the bellcrank being pivoted to a rearwardly extending actuating rod 49 which is operatively connected to the steering control 44 through any suitable mechanism (not shown) such as a chain and a sprocket drive, or rack and pinion device, to convert the linear movement of the rod to the rotary motion required to operate the control. A torsion spring associated with the pivoted stirrup 46 urges the stirrup rearwardly to maintain it in contact with a bar 50 mounted in front of and parallel to the rear member 18, and passing through a slot 51 in the right-hand parallel-motion arm 21. Consequently, when the parallel-motion arms swing in either direction, the stirrup 46 is caused to tilt forwardly, to increase the movement of the link 47, and the bellcrank 48 and actuating rod 49, Consequently, movement of the guide wheels to one side or the other results in the tractor being correspondingly steered.

A double-acting hydraulic ram 52 is connected between a bracket 53 at one side of the pivoted frame 17 and the parallel-motion arm 21 at the other side, and this ram is operable by a solenoid operated control valve 54 of known type, mounted above the transverse box section member 14. Normally, this control valve is in "floating" position, so that the ram will not resist the pivotal movement of the parallel-motion arms 21 in either direction under the influence of the guide wheels travelling in the furrow. However, means are provided for bringing the ram into operation to swing the parallel-motion arms in the appropriate direction if the guide wheels should commence to climb out of the furrow, to bring them back into it. If, for instance, the guide wheels should commence to climb the left-hand wall of the furrow, the left-hand guide wheel 38 will rise above the right hand wheel 39. The right-hand guide wheel mounting bracket 36 carries, on a bracket 55 a double-acting switch 56 connected in the electrical circuit of the solenoid operated control valve 54. This switch is operable by an arm 57 which is connected to a rod 58 pivoted to the left-hand guide wheel mounting bracket 35. Consequently, when the left-hand guide wheel 38 rises to a significant extent above the right-hand guide wheel 39, the switch 56 is operated to cause the control valve to direct fluid from the tractor's hydraulic system to extend the ram 52, so that the guide wheels are brought back into the furrow. If the right-hand guide wheel 39 should commence to climb the right-hand side of the furrow, the reverse action occurring, the ram being caused to retract to move the wheels back towards the left.

The shoe 42 also serves to keep the tractor correctly steered, being spring-loaded into contact with the wall, or left-hand side, of the furrow in which the carrier wheel 40 rides. The pivoted operable 43 on which the shoe is mounted coacts with a toggle switch 59 mounted on the carrier wheel mounting bracket 37, and connected in the electrical circuit of the solenoid operated control valve 54. If the guide wheels and carrier wheel commence to run off to the right of the furrow, the shoe 42 will spring outwards, closing the switch 59 to cause the control valve 54 to retract the ram 52, bring the wheels to the left. Therefore, either the raising of the right-hand guide wheel 39 above the left-hand guide wheel 38, or the movement to the left of the shoe 42, or both such movements, will cause the wheels to be moved back towards the left, the tractor, of course, being correspondingly steered. The provision of the shoe, then, is an additional safeguard, and may be a sensitive one as the wall of the furrow is normally a rather more accurate guide than the depth of the bottom of the freshly ploughed furrow.

To allow for the possibility that the left-hand guide wheel 38 and carrier wheel 40 may so rise from the furrow that the shoe 42 springs out to the left and the left-hand guide wheel 38 is brought above the level of the right-hand guide wheel 39, the electrical circuit and switching arrangement is such that the lifting of the left-hand guide wheel disconnects the part of the circuit including the switch 59.

When the furrow in which the wheels ride corners, say, to the left, the guide wheels follow it under the influence of the spring 41, the steering control device 44 thereupon causes the tractor front wheels to turn accordingly, and the linkage connection between the right front wheel of the tractor and the pivoted frame 17 causes the pivoted frame to return to normal relationship with the tractor.

In the unlikely event of the guide wheels and carrier wheel jumping completely from the furrow, so that, the guide wheels being at the same level, the left-hand turn signalled by the shoe 42 is not canceled by the rise of the left-hand guide wheel relative to the right-hand guide wheel, the tractor will be turned increasingly sharply to the left. Any suitable means (not shown) may be provided for cutting out the fuel pump when the control device is brought to maximum left turn position. If, before the tractor is thus brought to a halt, or if in any other circumstances the automatically steered tractor should encounter an obstacle, it is desirable that the tractor should be brought to a halt immediately.

To this end, there is mounted on the front crossmember 11 a lazy-tongs device part of which is indicated generally at 60. The left-hand rear extremity of the tongs device is pivoted at 61 to the left-hand side of the said crossmember, the right-hand rear part being fitted with rollers 62 engaging in slots 63 in the top and bottom of the crossmember 11. In like manner, the front extremities of the tongs are at one side pivoted to, and at the other side slidably engaged with, a transverse striker bar 64, having extension rods 65 pivoted to its sides so they can be folded forwardly, towards each other, and back, to lie above the striker bar, which may be brought back to the cross member 11 by folding the lazy-tongs. Normally during automatic steering of the tractor, the striker bar is in advanced position; and if it, or either extension bar, should strike an obstacle, the lazy-tongs are retracted (being shown in partly retracted position in FIG. 3) a roller 62, in its consequent lateral travel, operating a switch or other control device indicated at 66 to cause the tractor to be stopped.

Any suitable devices may be provided for stopping the tractor engine in the event or drop in hydraulic pressure or overheating.

Apparatus according to the invention will be found to be very effective in achieving the objects for which the invention has been devised. It will, of course, be understood that the particular embodiment of the invention herein described may be subject to many minor modifications of constructional detail and design, which will be readily apparent to persons skilled in the art, without departing from the scope of the invention as defined by the appended claims.

I claim:

1. Automatic steering means for a tractor including a mounting frame adapted to be mounted on a tractor; means for mounting a pair of guide wheels on the mounting frame so that they are adapted to travel in a furrow adjacent to the tractor, the said guide wheels being normally in spaced substantially coaxial alignment and adapted to move laterally in either direction to follow the furrow as the tractor advances, each guide wheel being further adapted to rise or fall independently of the other; means for transmitting lateral movement of the guide wheels to steering control means of the tractor to cause the tractor to be steered along a path parallel to that followed by the guide wheels, and correcting means adapted, on one guide wheel rising above the other, to move the two guide wheels laterally in the direction of the lower guide wheel.

2. Automatic steering means for a tractor according to claim 1 wherein the means for mounting the guide wheels consists of a pivoted frame including a rear member pivoted about an upright axis to the mounting frame, means for operatively connecting the said rear member to a steerable wheel of the tractor so that the said rear member is pivoted correspondingly to the said steerable wheel, and parallel motion arms extending from the said rear member and supporting independently hinged trailing mounting brackets on which the guide wheels are mounted.

3. Automatic steering means for a tractor according to claim 2 wherein the means for transmitting lateral movement of the guide wheels to steering control means of the tractor includes linkage connected between one of the said parallel motion arms and the said rear member and operatively connected to the said steering control means.

4. Automatic steering means for a tractor according to claim 2 wherein the correcting means includes a hydraulic ram operatively connected between one of the parallel motion arms and the said rear member and adapted to be operated by ram control means to extend or retract to cause the parallel motion arms to swing in one direction or the other relative to the said rear member.

5. Automatic steering means for a tractor according to claim 4 wherein the ram control means is electrically operated, and the correcting means includes a double-acting switch in the electrical circuit of the ram control means and mounted on one guide wheel mounting bracket, and operable by a member mounted on the other guide wheel mounting bracket.

6. Automatic steering means for a tractor according to claim 1 wherein means are provided for mounting on the mounting frame a carrier wheel adapted to travel in a furrow adjacent to the tractor, and supporting a pivoted shoe adapted to bear in spring-loaded manner against the wall of the furrow; and there are provided secondary correcting means adapted, on the shoe moving pivotally to a predetermined extent under its spring-loading, to move the guide wheels laterally in the direction of the furrow wall.

7. Automatic steering means for a tractor according to claim 1 wherein the mounting frame includes a laterally adjustable member to which the means for mounting the guide wheels is secured.

8. Automatic steering means for a tractor according to claim 1 wherein a transverse striker bar is mounted in front of the mounting frame in longitudinally movable manner, and means are provided being adapted, on the striker bar being moved rearwardly relative to the mounting frame, to stop the engine of the tractor.

9. Automatic steering means for a tractor according to claim 8 wherein extension arms are hinged to the sides of the striker bar, being adapted to be folded forwardly, towards each other and back to the striker bar.

10. Automatic steering means for a tractor according to claim 8 wherein the striker bar is supported in front of the mounting frame by a lazy tongs device.